United States Patent
Snyder et al.

(10) Patent No.: US 6,508,052 B1
(45) Date of Patent: Jan. 21, 2003

(54) PARTICLE SEPARATOR

(75) Inventors: Philip H. Snyder, Avon, IN (US); Baily Vittal, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 09/920,566

(22) Filed: Aug. 1, 2001

(51) Int. Cl.$^7$ ................................................ B01D 45/16
(52) U.S. Cl. ...................... 60/39.092; 55/306; 55/385.1; 55/385.3; 55/396; 244/53 B; 137/15.1
(58) Field of Search .................... 60/39.092; 55/306, 55/385.1, 385.3, 396, 398; 244/53 B; 137/15.1

(56) References Cited

U.S. PATENT DOCUMENTS

| | | |
|---|---|---|
| 3,521,431 A | 7/1970 | Connors et al. |
| 3,534,548 A | 10/1970 | Connors |
| 3,616,616 A | 11/1971 | Flatt |
| 3,673,771 A | 7/1972 | Dickey |
| 3,778,983 A | 12/1973 | Rygg |
| 3,832,086 A | 8/1974 | Hull, Jr. et al. |
| 3,970,439 A | 7/1976 | Murphy |
| 3,998,048 A | 12/1976 | Derue |
| 4,509,962 A | 4/1985 | Breitman et al. |
| 4,527,387 A * | 7/1985 | Lastrina et al. ........... 244/53 B |
| 4,592,765 A | 6/1986 | Breitman et al. |
| 4,617,028 A | 10/1986 | Ray et al. |
| 4,685,942 A * | 8/1987 | Klassen et al. ............ 137/15.1 |
| 4,702,071 A | 10/1987 | Jenkins et al. |
| 4,704,145 A | 11/1987 | Norris et al. |
| 4,860,534 A | 8/1989 | Easley et al. |
| 4,881,367 A | 11/1989 | Flatman |
| 5,039,317 A | 8/1991 | Thompson et al. |
| 5,139,545 A | 8/1992 | Mann |
| 5,433,070 A * | 7/1995 | Amelio ...................... 137/15.1 |
| 6,134,874 A | 10/2000 | Stoten |

* cited by examiner

*Primary Examiner*—Charles G. Freay
(74) *Attorney, Agent, or Firm*—Barnes & Thornburg

(57) ABSTRACT

An attachment for the air intake of a gas turbine engine includes a plurality of particle separators. The particle separators cooperate to define an attachment axis and are spaced circumferentially about the attachment axis. Each particle separator includes a housing defining a separator axis, a first flow passage having at least a portion that is annular, an annular opening, and an annular second flow passage. The first and second flow passages are configured so that inertia of particles entrained in a stream of air flowing through the annular portion of the first flow passage tends to cause the particles to flow from the annular portion through the opening into the second flow passage to allow the stream of air to enter the engine flow passage free of the particles removed therefrom. The separator axes are parallel to and spaced apart from the attachment axis.

34 Claims, 8 Drawing Sheets

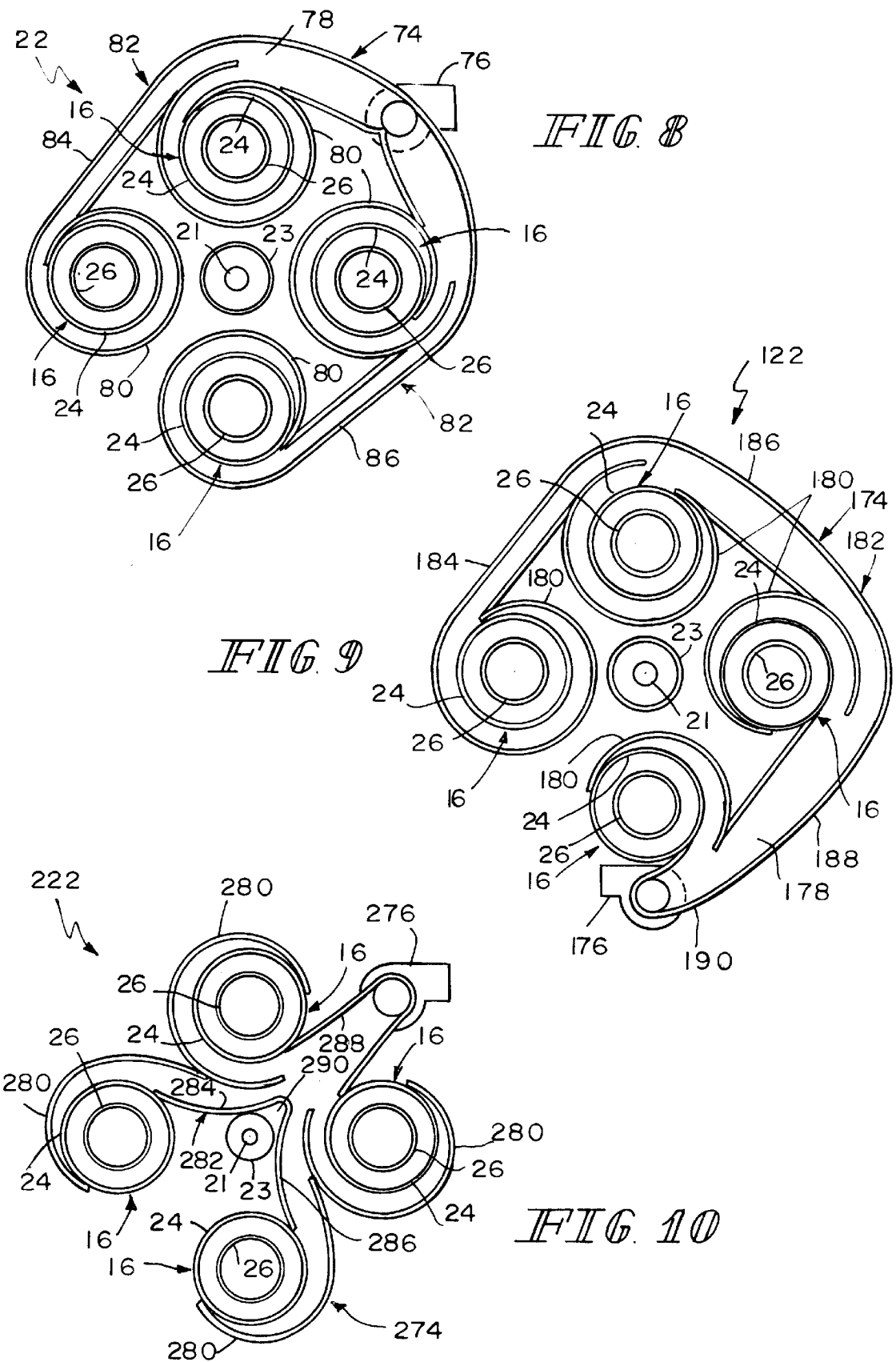

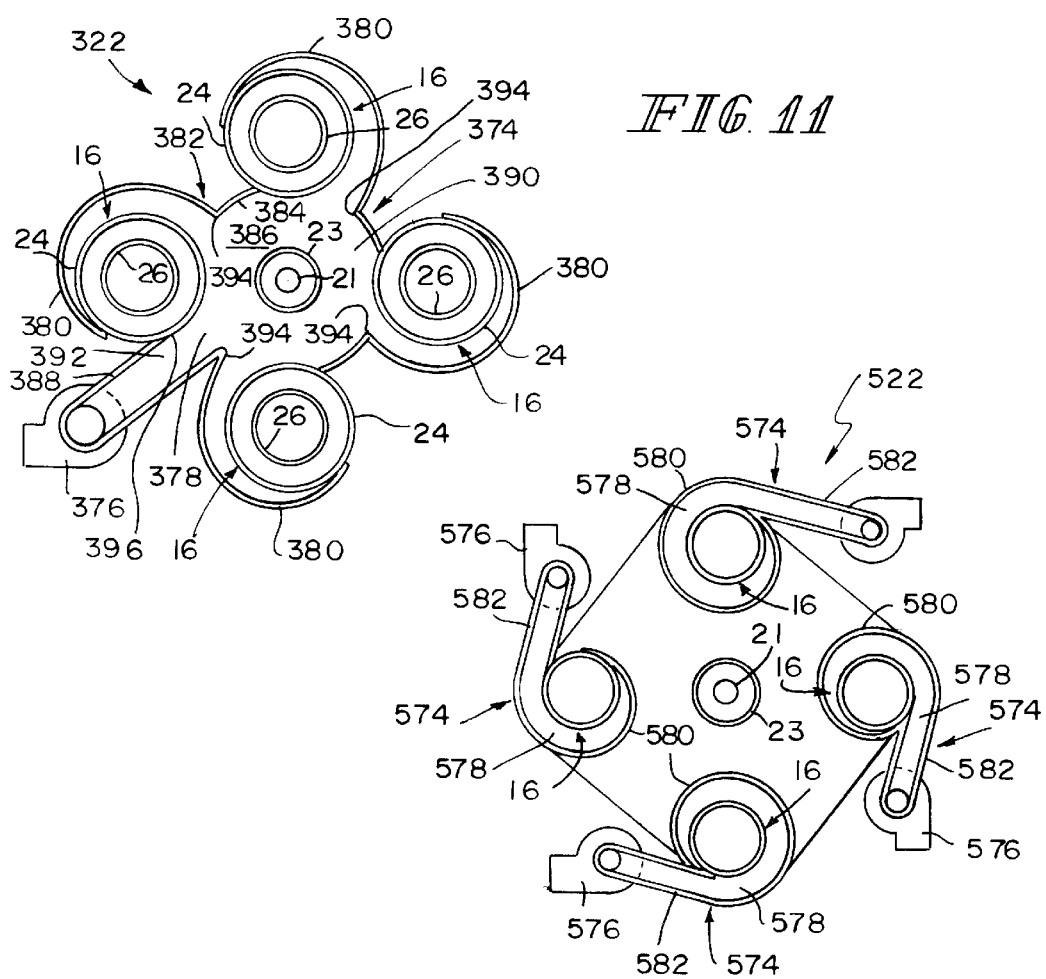
FIG. 11
FIG. 12
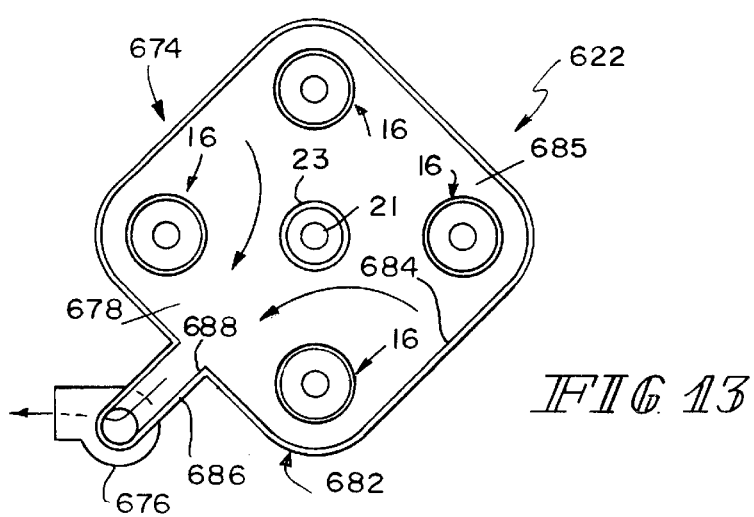
FIG. 13

PARTICLE SEPARATOR

BACKGROUND AND SUMMARY OF THE INVENTION

The present invention relates to a particle separator, and particularly to a particle separator for a gas turbine engine. More particularly, the present invention relates to a plurality of particle separators arranged to separate particles from a stream of air entering an air intake of the engine.

Particle separators are provided to separate undesirable particles from a stream of air entering a gas turbine engine. Such particles can adversely affect the internal working components of the engine. Some engines are intended to operate in particulate-laden environments, such as in dusty and sandy locations. In these types of environments, a particle separator capable of separating fine particles (e.g., particles having a diameter of 2.5 microns) from the stream of air entering the engine would help protect the engine.

According to the disclosure, an attachment is provided for the air intake of a gas turbine engine to separate undesirable particles from a stream of air entering the engine. The attachment includes a plurality of particle separators adapted to be coupled to the housing of the engine. The particle separators cooperate to define an attachment axis and are spaced circumferentially about the attachment axis. Each particle separator includes a housing defining a separator axis, a first flow passage having at least a portion that is annular, an annular opening, and an annular second flow passage positioned in fluid communication with the annular portion of the first flow passage through the opening.

The first flow passage and the second flow passage are configured so that inertia of particles entrained in the stream of air flowing through the annular portion of the first flow passage tends to cause the particles to flow from the annular portion of the first flow passage through the opening into the second flow passage to allow the stream of air to enter the engine flow passage from the first flow passage free of the particles removed therefrom. The separator axes are parallel to and spaced apart from the attachment axis.

In some illustrative embodiments, the attachment further includes a particle discharger comprising a manifold defining a third flow passage positioned to receive particles from the second flow passages of at least two of the particle separators and a blower coupled to the manifold to discharge particles from the third flow passage. In another illustrative embodiment, the attachment includes a plurality of particle dischargers wherein each particle discharger is associated with only one of the particle separators.

Additional features of the present invention will become apparent to those of ordinary skill in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which:

FIG. 8 is a cross sectional view of a particle discharger for one of the attachments;

FIG. 9 is a cross sectional view of another particle discharger;

FIG. 10 is a cross sectional view of yet another particle discharger;

FIG. 11 is a cross sectional view of yet another particle discharger;

FIG. 12 is a cross sectional view of four particle dischargers, each particle discharger being provided for only one of the particle separators;

FIG. 13 is a cross sectional view of another particle discharger; and

DETAILED DESCRIPTION OF THE DRAWINGS

An attachment 10 is provided for an air intake 12 of a housing 13 of a gas turbine engine 14, as illustrated, for example, in FIGS. 1–4. Attachment 10 is configured to separate particles from a stream of air flowing through attachment 10 before the air stream enters engine 14 to protect the engine's working components against potential damage from the removed particles.

Figure 1:
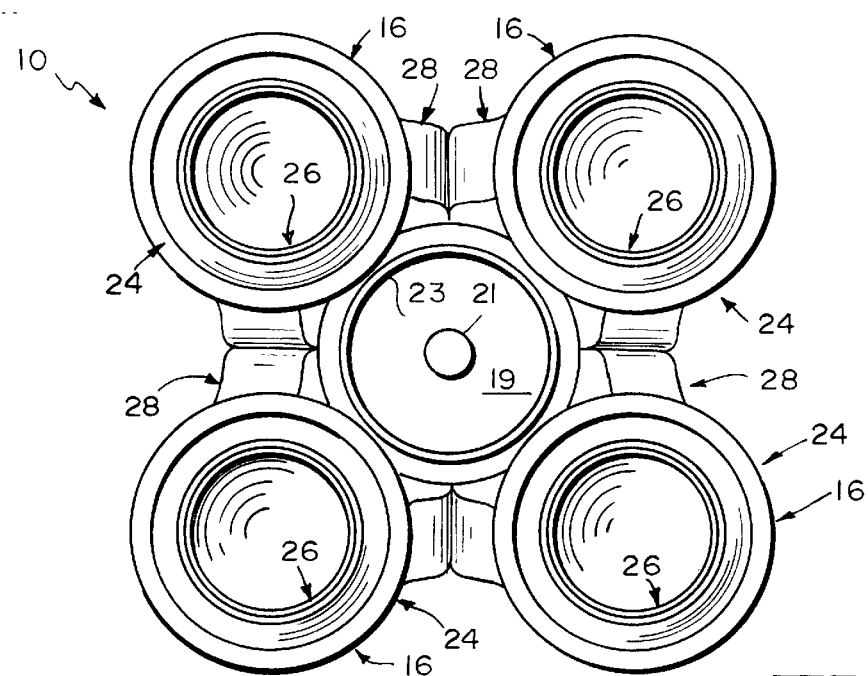
FIG. 1 is a front elevational view of an attachment for the air intake of a gas turbine engine showing the attachment including four particle separators.
Figure 2:
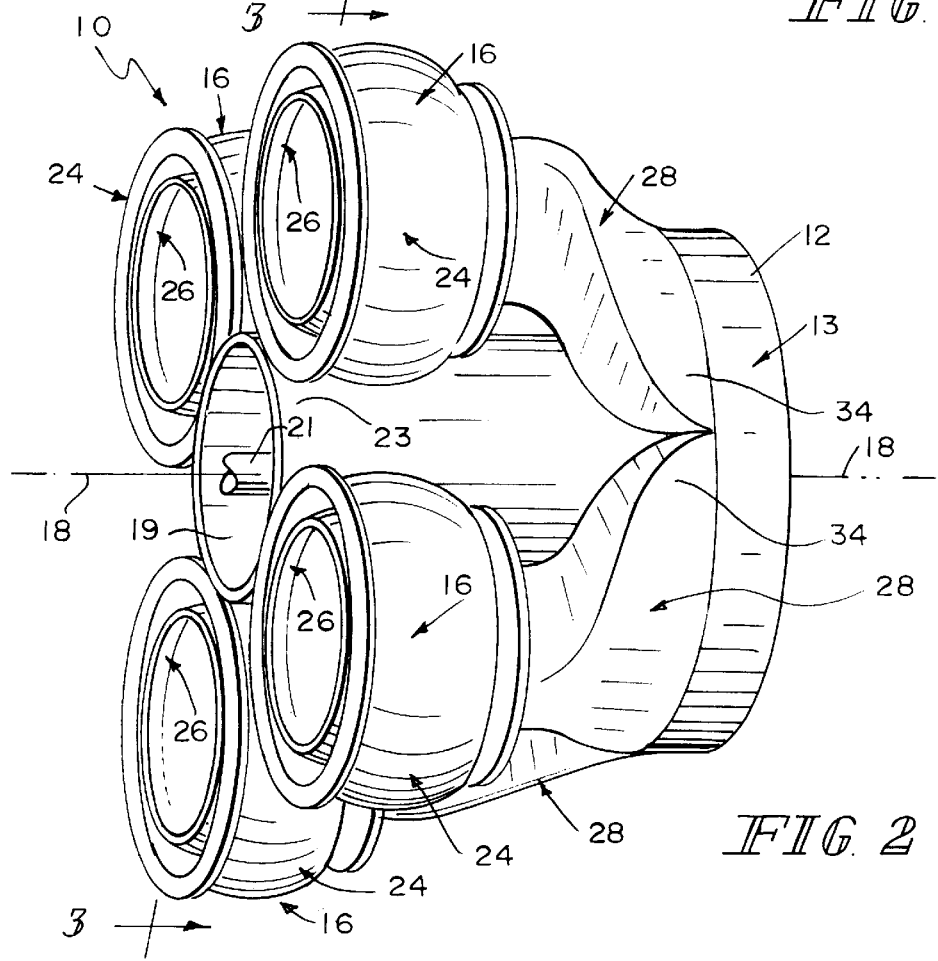
FIG. 2 is a perspective view of the attachment of FIG. 1.

Attachment 10 includes a plurality of inertial particles separators 16 spaced circumferentially about an attachment axis 18 and adapted to be coupled to a air intake 12 of engine housing 13, as illustrated, for example, in FIGS. 1–2. Each particle separator 16 is configured to separate the particles from the air that enters an annular engine flow passage 20 defined by engine housing 13. Attachment 10 includes four particle separators 16. Particle separators 16 cooperate to define a space 19 through which a sleeve 23 extends. A drive shaft 21 of engine 14 extends through sleeve 23. Drive shaft 21 defines an axis of rotation which coincides with attachment axis 18.

By providing a plurality of particle separators 16, the particle separation efficiency of attachment 10 is increased relative to an attachment having only one particle separator for reasons discussed below. The structure of each particle separator 16 is discussed in more detail below.

Attachment 10 further includes at least one particle discharger 22 configured to discharge particles removed from the stream of air entering engine 14, as illustrated, for example, in FIG. 8. Various means for discharging the removed particles are discussed below.

Particle separators 16 are similar to one another in structure and function. Thus, the description of one of particle separator 16 applies also to the other particle separators 16.

Figure 3:
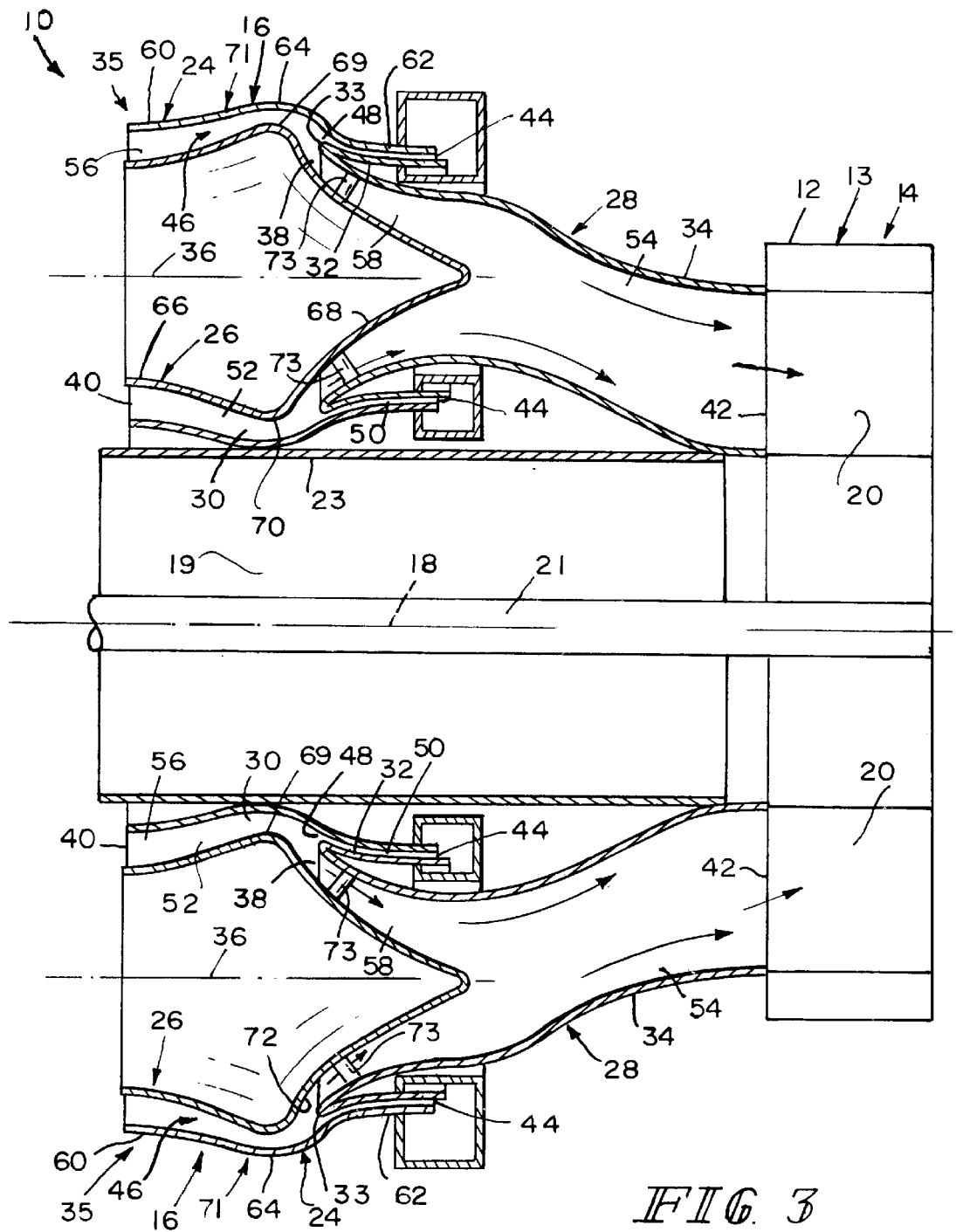
FIG. 3 is a cross sectional view taken along line 3—3 of FIG. 2 showing two of the four particle separators.
Figure 4:
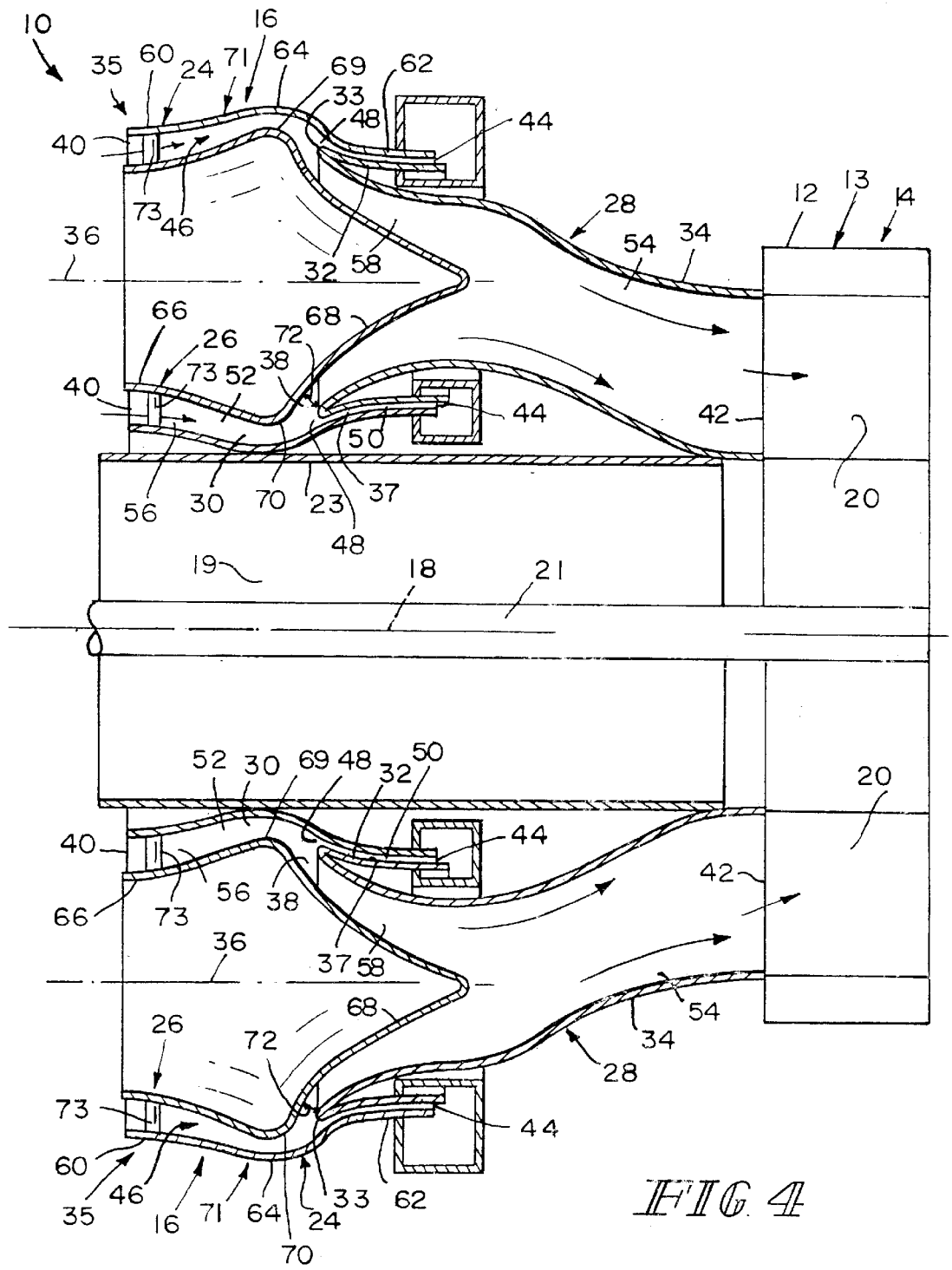
FIG. 4 is a cross sectional view similar to FIG. 3.
Figure 5:
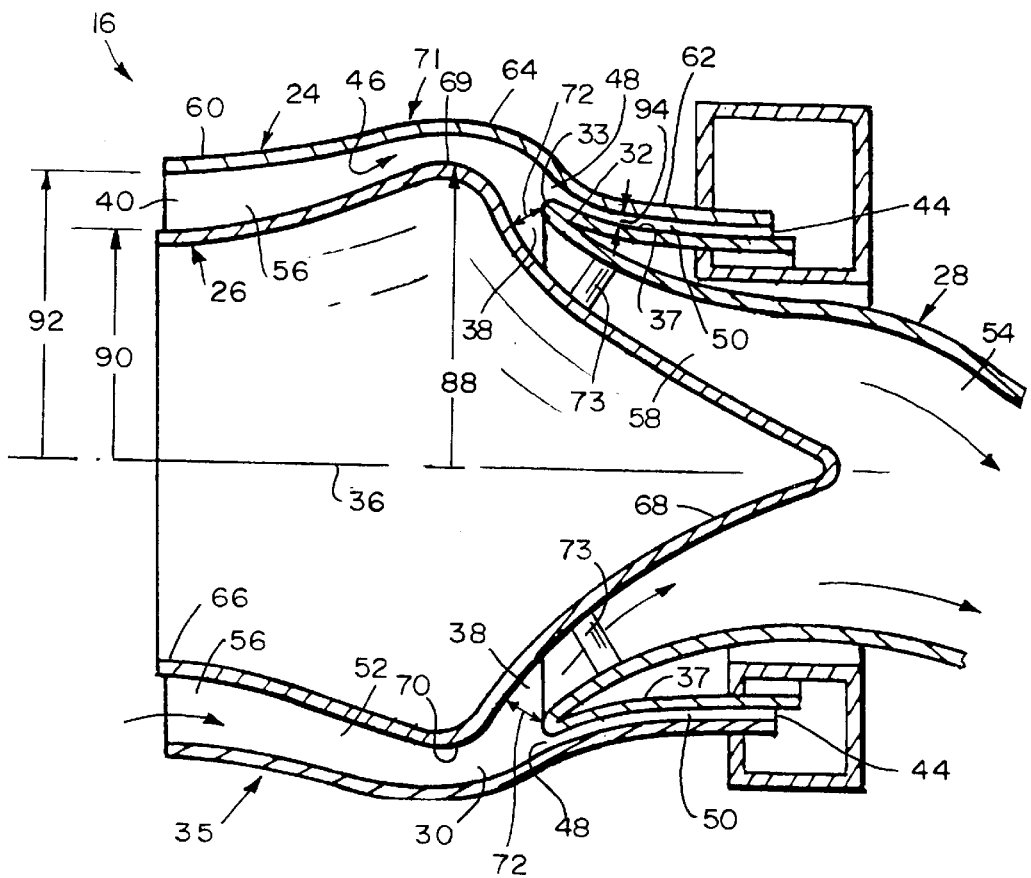
FIG. 5 is an enlarged cross sectional view of one of the particle separators, with portions broken away.

Particle separator 16 includes a housing 35 defining a separator axis 36 that is parallel to and spaced apart from attachment axis 18, as illustrated, for example, in FIGS. 3–5. Housing 35 further defines an annular inlet 40, a first outlet 42 positioned in fluid communication with engine flow passage 20, and a first flow passage 46 extending from inlet 40 to first outlet 42. Housing 35 also defines an annular opening 48, an annular second outlet 44, and an annular second flow passage 50 positioned in fluid communication with first flow passage 46 through opening 48 and extending from opening 48 to second outlet 44. Inlet 40, flow passages 46, 50, outlets 42, 44, and opening 48 are concentric about separator axis 36.

First flow passage 46 includes an annular portion 52 positioned in fluid communication with inlet 40 and a non-annular, outlet portion 54 positioned in fluid communication with first outlet 42, as illustrated, for example, in FIGS. 3–5. Annular portion 52 includes an annular inlet portion 56 positioned upstream of opening 48 and an annular intermediate portion 58 positioned downstream of opening 48.

Housing 35 includes an outer sleeve or duct 24 and an inner body 26, as illustrated, for example, in FIGS. 1–5. Outer duct 24 defines an interior region 30. Inner body 26 is positioned in interior region 30.

Outer duct 24 includes an axially forward portion 60, an axially rearward portion 62, and a curved peak 64 coupled to axially forward and rearward portions 60, 62, as illustrated, for example, in FIGS. 3–5. Illustratively, a radius 92 of axially forward portion 60 is about 3.59 inches. Rearward portion 62 is positioned radially inwardly from axially forward portion 60.

Inner body 26 includes an axially forward portion 66, an axially rearward cone 68, and a curved peak 70 coupled to axially forward portion 66 and rearward cone 68, as illustrated, for example, in FIGS. 3–5. Illustratively, a radius 90 of axially forward portion 66 at inlet 40 is about 2.74 inches. Peak 70 includes a radially outermost portion 69. Illustratively, a radius 88 of radially outermost portion 69 is about 3.43 inches. Peaks 64, 70 cooperate to define a radially outwardly diverging portion of particle separator 16.

Axially forward portion 60 of outer duct 24 and axially forward portion 66 of inner body 26 may be cylindrical and have the same axial length, although portions 60, 66 are illustrated as being somewhat curved in FIGS. 3–5. In addition, the interface between axially forward portion 60 and curved peak 64 of outer duct 24 and the interface between axially forward portion 66 and curved peak 70 of inner body 26 may lie on the same plane transverse to separator axis 36. Axially rearward portion 62 of outer duct 24 may also be cylindrical, although portion 62 is illustrated as being somewhat curved in FIGS. 3–5.

Housing 35 further includes a transition duct 28, as illustrated, for example, in FIGS. 1–5. Transition duct 28 includes a partition portion 32 positioned in interior region 30. Partition portion 32 includes a splitter 33 and a radially outer wall 37. Splitter is arranged to help separate particles from the stream of air entering engine 14. Radially outer wall 37 may be cylindrical, although it is illustrated as being somewhat curved in FIGS. 3–5. In addition, the interface between radially outer wall 37 and splitter 33 and the interface between axially rearward portion 62 and curved peak 64 of outer duct 24 may lie on the same plane transverse to separator axis 18. Illustratively, a distance between axially rearward portion 62 of outer duct 24 and radially outer wall 37 of partition portion 32 is about 0.17 inch.

Transition duct 28 further includes a diffuser portion 34 coupled to partition portion 32 and extending axially rearwardly and radially inwardly from partition portion 32. Diffuser portion 34 is adapted to couple to air intake 12 of engine housing 13.

Outer duct 24, inner body 26, and partition portion 32 cooperate to define a separator section 71 of particle separator 16, as illustrated, for example, in FIGS. 3–5. Separator section 71 performs the particle separation function of particle separator 16 and defines separator axis 36. Diffuser portion 34 provides the stream of air a smooth transition from separator section 71 to engine flow passage 20.

Inner body 26, transition duct 28, axially forward portion 60 of outer duct 24, and curved peak 64 of outer duct 24 cooperate to define first flow passage 46, as illustrated, for example, in FIGS. 3–5. In particular, axially forward portion 60 of outer duct 24, curved peak 64 of outer duct 24, axially forward portion 66 of inner body 26, and curved peak 70 of inner body 26 cooperate to define annular inlet portion 46 of first flow passage 46. Partition portion 32 of transition duct 28 and cone 68 cooperate to define annular intermediate portion 58 of first flow passage 46. Diffuser portion 34 defines non-annular, outlet portion 54 of first flow passage 46 and first outlet 42.

Splitter 33 and curved peak 64 of outer duct 24 cooperate to define opening 48, as illustrated, for example, in FIGS. 3–5. Splitter 33 and curved peak 70 of inner body 26 cooperate to define an annular opening 38 and a distance 72 across opening 38. The significance of distance 72 is discussed below.

A plurality of struts 73 are spaced circumferentially about separator axis 36 in intermediate portion 58 of first flow passage 46 to mount inner body 26 to partition portion 32 of transition duct 28 for support of inner body 26, as illustrated, for example, in FIGS. 3 and 5. Illustratively, six struts 73 are provided although other numbers of struts 73 are within the scope of this disclosure. Alternatively, struts 73 are spaced circumferentially about separator axis 36 in inlet portion 56 of first flow passage 46 to mount inner body 26 to outer duct 24 for support of inner body 26, as illustrated, for example, in FIG. 4.

A stream of air with particles entrained therein enters particle separator 16 through inlet 40. The air stream and particles flow through annular inlet portion 56 of first flow passage 46. Peaks 64, 70 cooperate to turn the air stream and the particles first radially outwardly and then radially inwardly. Although some of the air flows through opening 48 into second flow passage 50, most of the air flows into intermediate portion 58 of first flow passage and continues on to engine flow passage 20. However, because the particles are more dense than the air, the inertia of the particles causes many of the particles to remain radially outwardly from intermediate portion 58 and splitter 33 so that those particles flow through opening 48 into second flow passage 50 to prevent the removed particles from entering engine flow passage 20.

Distance 72 between splitter 33 and peak 70 of inner body 26 affects the size of particulate for which separation occurs (see FIG. 5). A larger distance 72 generally correlates to less particle separation of smaller particles whereas a shorter distance 72 generally correlates to more particle separation of smaller particles.

In addition, the rate at which each particle separator 16 turns the air as the air passes from inlet portion 56 of first flow passage 46 to intermediate portion 58 of first flow passage 46 also affects the size of particulate for which separation occurs. Slower turning of the air generally correlates to a less particle separation of smaller particles. On the other hand, rapid turning of the air generally correlates to more particle separation of smaller particles.

Changes to the geometric scale of particle separator 16 would alter both distance 72 and the turning rate simultaneously. Uniform geometric scaling of particle separator 16 to smaller dimensions generally correlates to particle separation of smaller particles. Upon uniform geometric scaling of particle separator 16 to smaller dimensions, the flow rate in particle separator 16 must be reduced to maintain the same pressure loss through particle separator 16. To counter this decrease in flow rate without increasing the pressure loss across attachment 10, attachment 10 provides a plurality of particle separators 16 to handle a greater flow rate for engine 14. Thus, providing a plurality of uniformly geometrically reduced particle separators 16 enhances small particle separation without incurring a pressure loss penalty across attachment 10 or requiring a reduction in the overall flow rate through air intake 12 of housing 13 of gas turbine engine 14.

Particle separators 16 are spaced at equal arcuate intervals about attachment axis 18, as illustrated, for example, in FIGS. 1 and 2. Thus, when attachment 10 has four particle separators 16, the arcuate spacing is about 90°. In addition, separator axes are spaced equidistantly from attachment axis 18, as illustrated, for example, in FIGS. 3–5. Inlets 40 of particle separators 16 face axially forwardly and are positioned on a plane transverse to attachment axis 10.

Diffuser portions 34 of circumferentially adjacent particle separators 16 abut one another near respective first outlets 42, as illustrated, for example, in FIG. 1. Diffuser portions 34 cooperate to define a ring that aligns with engine flow passage 20 so that first outlets 42 are positioned in fluid communication with engine flow passage 20.

Particle discharger 22 includes a manifold 74 coupled to each of particle separators 16 and a blower 76 coupled to manifold 74, as illustrated, for example, in FIG. 8. Manifold 74 defines a third flow passage 78 positioned in fluid communication with each of second outlets 44. Blower 76 is configured to draw particles from second flow passages 50 through second outlets 44 into third flow passage 78 to discharge particles therefrom outside of attachment 10.

Manifold 74 includes a four scrolls 80, one for each particle separator 16, and a connector 82 coupled to each of scrolls 80 and blower 76. Scrolls 80 and connector 82 cooperate to define third flow passage 78.

Each scroll 80 is coupled to housing 35 of one of particle separators 16 at respective second outlet 44. Each scroll 80 enlarges as it extends circumferentially about respective housing 35 from respective second outlet 44 to connector 82. Two of scrolls 80 extend circumferentially in a clockwise manner about respective housing 35 whereas two scrolls 80 extend circumferentially in a counter-clockwise manner about respective housing 35. For purposes of this disclosure and the attached claims, the terms "clockwise" and "counter-clockwise" are relative to respective separator axis 36 as one looks rearwardly along that axis.

Connector 82 includes a first branch 84 and a second branch 86. Both branches 84, 86 are coupled to blower 76. The two clockwise scrolls 80 are coupled to first branch 84 to empty its contents therein. The two counter-clockwise scrolls 80 are coupled to second branch 86 to empty its contents therein. Branches 84 and 86 are positioned in a parallel flow arrangement.

Relative to attachment axis 18, connector 82 is positioned radially outwardly from the four scrolls 80. In particular, first branch 84 is positioned radially outwardly from the two clockwise scrolls 80 and second branch 86 is positioned radially outwardly from the two counter-clockwise scrolls 80.

In another embodiment, a particle discharger 122 is provided to discharge particles removed from the stream of air entering engine 14, as illustrated, for example, in FIG. 9. Particle discharger 122 includes a manifold 174 coupled to each of particle separators 16 and a blower 176 coupled to manifold 174. Manifold 174 defines a third flow passage 178 positioned in fluid communication with each of second outlets 44. Blower 176 is configured to draw particles from second flow passages 50 through second outlets 44 into third flow passage 178 to discharge particles therefrom outside of attachment 10.

Manifold 174 includes four scrolls 180, one for each particle separator 16, and a connector 182 coupled to each of scrolls 180 and blower 176. Scrolls 180 and connector 182 cooperate to define third flow passage 178. Relative to attachment axis 18, connector 182 is positioned radially outwardly from the four scrolls 180.

Each scroll 180 is coupled to housing 35 of one of particle separators 16 at respective second outlet 44. Each scroll 180 enlarges as it extends circumferentially in a clockwise manner about respective housing 35 from respective second outlet 44 to connector 182. All four scrolls 180 extend clockwise about respective separator axis 36.

Connector 182 includes a first branch 184, a second branch 186, a third branch 188, and a fourth branch 190 coupled to blower 176. Branches 182, 184, 186, 188 are positioned in a series flow arrangement. A first of scrolls 180 empties directly into first branch 182. A second of scrolls 180 empties directly into second branch 184. A third of scrolls 180 empties directly into third branch 186. A fourth of scrolls 180 empties directly into fourth branch 188.

In yet another embodiment, a particle discharger 222 is provided to discharge particles removed from the stream of air entering engine 14, as illustrated, for example, in FIG. 10. Particle discharger 222 includes a manifold 274 coupled to each of particle separators 16 and a blower 276 coupled to manifold 274. Manifold 274 defines a third flow passage 278 positioned in fluid communication with each of second outlets 44. Blower 276 is configured to draw particles from second flow passages 50 through second outlets 44 into third flow passage 278 to discharge particles therefrom outside of attachment 10.

Manifold 274 includes four scrolls 280, one for each particle separator 16, and a connector 282 coupled to each of scrolls 280 and blower 276. Scrolls 280 and connector 282 cooperate to define third flow passage 278.

Each scroll 180 is coupled to housing 35 of one of particle separators 16 at respective second outlet 44. Each scroll 180 enlarges as it extends circumferentially about respective housing 35 from respective second outlet 44 to connector 182. Two of scrolls 280 extend circumferentially in a clockwise manner about respective housing 35 whereas two of scrolls 80 extend circumferentially in a counter-clockwise manner about respective housing 35.

Connector 282 includes a first branch 284, a second branch 286, and a third branch 288 coupled to blower 276. A first of scrolls 280 empties directly into first branch 284. A second of scrolls 280 empties directly into second branch 286. A third and a fourth of scrolls 280 empty directly into third branch 288. First and second branches also empty into third branch 288. First and second branches 284, 286 are positioned in a space 290 radially inwardly from particle separators 16 relative to attachment axis 18.

In yet another embodiment, a particle discharger 322 is provided to discharge particles removed from the stream of air entering engine 14, as illustrated, for example, in FIG. 11. Particle discharger 322 includes a manifold 374 coupled to each of particle separators 16 and a blower 376 coupled to manifold 374. Manifold 374 defines a third flow passage 378 positioned in fluid communication with each of second outlets 44. Blower 376 is configured to draw particles from second flow passages 50 through second outlets 44 into third flow passage 378 to discharge particles therefrom outside of attachment 10.

Manifold 374 includes four scrolls 380, one for each particle separator 16, and a connector 382 coupled to each of scrolls 380 and blower 376. Scrolls 380 and connector 382 cooperate to define third flow passage 378.

Each scroll 380 is coupled to housing 35 of one of particle separators 16 at respective second outlet 44. Each scroll 380 enlarges as it extends circumferentially about respective housing 35 from respective second outlet 44 to connector 382. All four scrolls 380 extend circumferentially in a clockwise manner about respective housing 35.

Connector 382 includes a shell 384 defining an interior chamber 386 and an outlet branch 388 coupled to blower 376. Shell 384 and outlet branch 376 cooperate to define third flow passage 378. Shell 284 includes four inlet apertures 394 and an outlet aperture 396. Each scroll 280 empties its contents into chamber 286 through one of the inlet apertures. The particles then flow from chamber 386 through the outlet aperture, outlet branch 388, and blower 376.

Shell 384 is positioned in a space 390 defined radially inwardly from each of particle separators 16 relative to attachment axis 18. Outlet branch 388 extends through a space 392 defined between a pair of particle separators 16.

Figure 14:
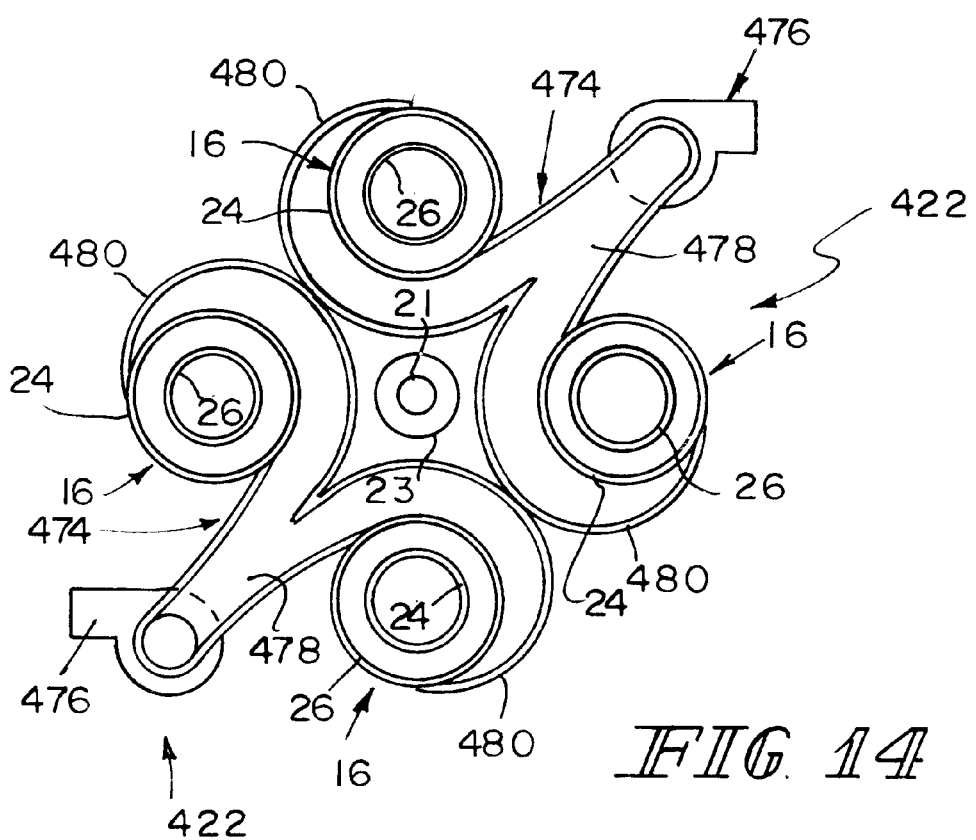
FIG. 14 is a cross sectional view of two particle dischargers, each particle discharger being provided for two of the particle separators.

In yet another embodiment, two particle dischargers 422 are provided to discharge particles removed from the stream of air entering engine 14, as illustrated, for example, in FIG. 14. Particle dischargers 422 are similar in structure and function to one another so the description of one of particle dischargers 422 also applies to the other particle discharger 422.

Particle discharger 422 includes a manifold 474 coupled to two of particle separators 16 and a blower 476 coupled to manifold 474. Manifold 474 defines a third flow passage 478 positioned in fluid communication with two of second outlets 44. Blower 476 is configured to draw particles from respective second flow passages 50 through respective second outlets 44 into third flow passage 478 to discharge particles therefrom outside of attachment 10.

Manifold 474 includes two scrolls 480, one for each of respective particle separators 16, and a connector 482 coupled to scrolls 480 and blower 476. Scrolls 480 and connector 482 cooperate to define third flow passage 478. Scrolls 480 empty directly into connector 482.

Each scroll 480 is coupled to housing 35 of one of particle separators 16 at respective second outlet 44. Each scroll 480 enlarges as it extends circumferentially about respective housing 35 from respective second outlet 44 to connector 482. One of the two scrolls 480 extends circumferentially in a clockwise manner about respective housing 35 whereas the other one of the two scrolls 480 extends circumferentially in a counter-clockwise manner about respective housing 35.

Particle dischargers 422 are arranged so that connectors 482 and blowers 476 are positioned diametrically opposite to one another relative to attachment axis 18.

In yet another embodiment, four particle dischargers 522 are provided to discharge particles removed from the stream of air entering engine 14, as illustrated, for example, in FIG. 12. Each particle discharger 522 is associated with only one of particle separators 16. Particle dischargers 522 are similar in structure and function to one another so the description of one of particle dischargers 522 also applies to the other particle dischargers 522.

Particle discharger 522 includes a manifold 574 coupled to respective particle separator 16 and a blower 576 coupled to manifold 574. Manifold 574 defines a third flow passage 578 positioned in fluid communication with respective second outlet 44. Blower 576 is configured to draw particles from respective second flow passage 50 through respective second outlet 44 into third flow passage 578 to discharge particles therefrom outside of attachment 10.

Manifold 574 includes one scroll 580 for respective particle separator 16 and a connector 582 coupled to scroll 580 and blower 576. Scroll 580 and connector 582 cooperate to define third flow passage 578. Scroll 580 empties directly into connector 582.

Scroll 580 is coupled to housing 35 of respective particle separator 16 at respective second outlet 44. Scroll 580 enlarges as it extends circumferentially about respective housing 35 from respective second outlet 44 to connector 582. Scroll 580 extends circumferentially in a clockwise manner about respective housing 35.

In yet another embodiment, a scroll-less particle discharger 622 is provided to discharge particles removed from the stream of air entering engine 14, as illustrated, for example, in FIG. 13. Particle discharger 622 is associated with each of particle separators 16.

Particle discharger 622 includes a manifold 674 associated with each of particle separators 16 and a blower 676 coupled to manifold 674. Manifold 674 includes a shell 684 and an outlet branch coupled to shell 684.

Shell 684 defines an interior chamber 685. Each particle separator 16 is positioned in interior chamber 685 so that shell 684 surrounds each particle separator 16. Shell 684 is formed to include an outlet aperture 688 to allow communication between interior chamber 685 and outlet branch 686.

Blower 676 draws air and particles from second flow passages 50 through second outlets 44 into interior chamber 685. Blower 676 further draws the air and particles from interior chamber through outlet aperture 68 and outlet branch 686 to discharge particles outside of attachment 10.

Figure 6:
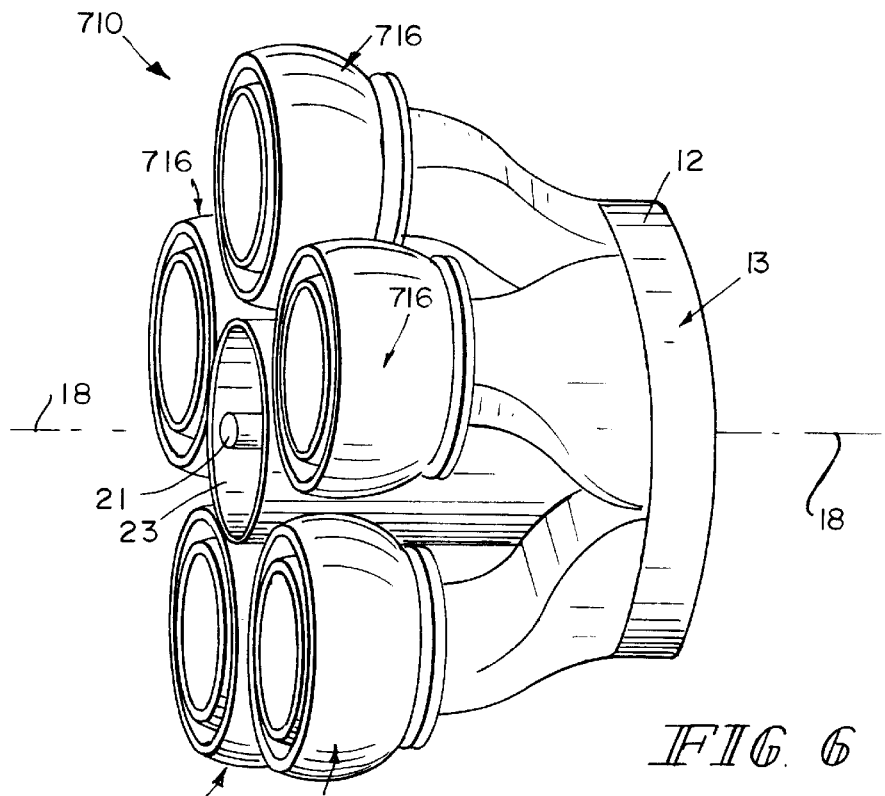
FIG. 6 is a perspective view of another attachment for the air intake of a gas turbine engine showing the attachment including five particle separators.

In an alternative embodiment of attachment 10, an attachment 710 has five particle separators 716, as illustrated, for example, in FIG. 6. This allows distance 72 to be further reduced for effective particle separation. Inlets 40 of particle separators 16 are aligned on a plane transverse to attachment axis 18. Each particle separator 716 is similar in structure and function to particle separator 16 except that particle separator 716 is smaller than particle separator 16.

Figure 7:
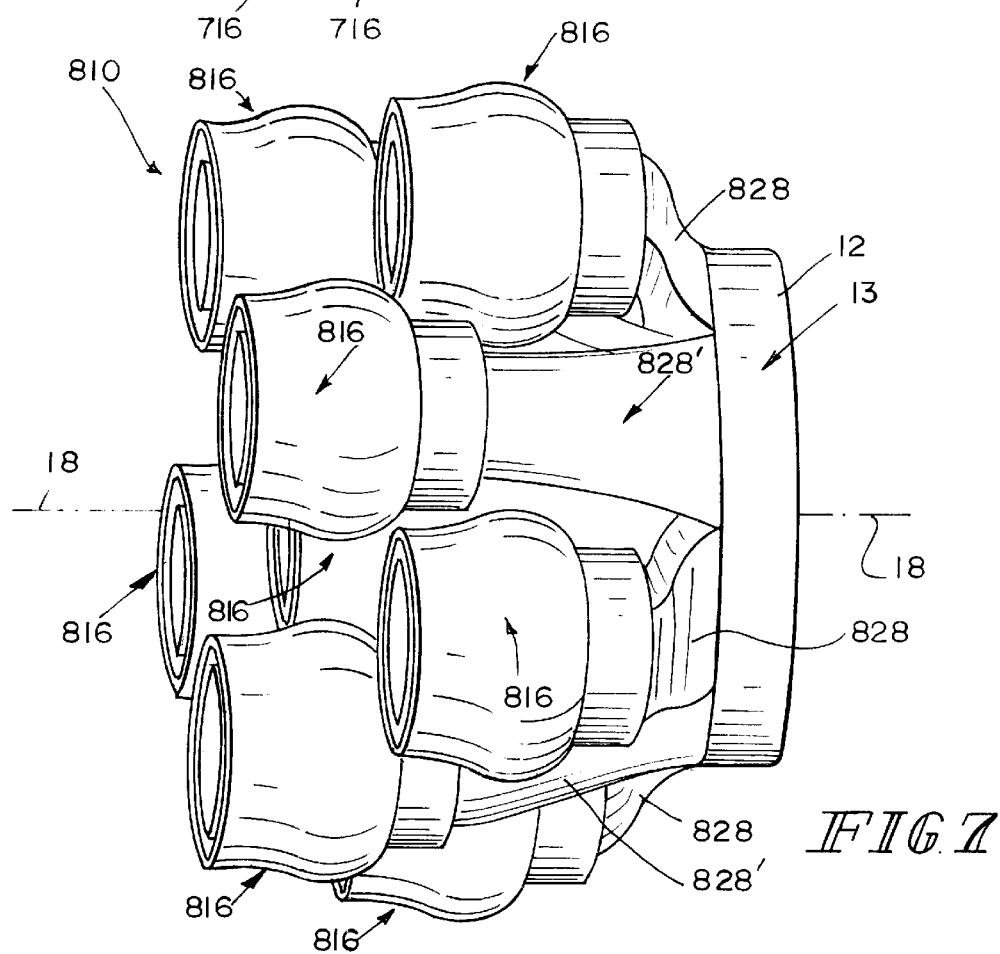
FIG. 7 is a perspective view of yet another attachment for the air intake of a gas turbine engine showing the attachment including eight particle separators.

In yet another alternative embodiment of attachment 10, an attachment 810 has eight particle separators 816, as illustrated, for example, in FIG. 7. This allows further reduction of distance 72. Circumferentially adjacent particle separators of attachment 810 are axially offset from one another. In particular, four particle separators 816 are aligned on a first plane transverse to attachment axis 18 and the other four particle separators 816 are aligned on a second plane transverse to attachment axis 18 wherein the second plane is offset axially from the first plane.

Each particle separator 816 is similar in structure and function to particle separator 16 except that each particle separator 816 is smaller in size than particle separator 16. In addition, some of particle separators 816 have a relatively short transition duct 828 while the other particle separators 816 have a relatively long transition duct 828'.

Although attachments having 4, 5, and 6 particle separators have been disclosed herein, the attachment may have other numbers of particle separators. In general, it is believed that the attachment may be provided with three to 20 particle separators.

It is believed that the attachments described herein can separate crushed quartz particles having a diameter of 2.5 microns or greater from a stream of air having a flow rate of 12.5 lbm/sec with a pressure loss of no more than 1.5% across the attachment. The bulk air flow velocity through annular opening 38 can be between 0.4 Mach and 0.8 Mach. It is believed that the attachments disclosed herein can separate other particles besides crushed quartz, although the size of those particles may differ from 2.5 microns.

It will be appreciated that the actual dimensions of each attachment, and in particular the particle separators of each attachment, will be dictated by a wide variety of parameters. Typically, a design engineer will use computer-aided design techniques to run computer simulations and vary the dimensions to tailor the particle separators to the specific application. While FIGS. 1–7 show generally representative proportioning of three attachments 10, 710, and 810 for a single application, it will be appreciated that the dimensions will change with varying applications.

Although the invention has been described in detail with reference to certain illustrative embodiments, variations and modifications exist within the scope and spirit of the invention as described and defined in the following claims.

What is claimed is:

1. An attachment for the air intake of a gas turbine engine comprising an engine housing defining an engine flow passage, the attachment comprising:
    a plurality of particle separators adapted to be coupled to the engine housing and cooperating to define an attachment axis, the particle separators being spaced circumferentially about the attachment axis,
    each particle separator comprising a housing defining a separator axis, a first flow passage having at least a portion that is annular, an annular opening, and an annular second flow passage positioned in fluid communication with the annular portion of the first flow passage through the opening, the annular portion of the first flow passage, the opening, and the second flow passage being concentric about the separator axis, the first flow passage and the second flow passage being configured so that inertia of particles entrained in a stream of air flowing through the annular portion of the first flow passage tends to cause the particles to flow from the annular portion of the first flow passage through the opening into the second flow passage to allow the stream of air to enter the engine flow passage from the first flow passage free of the particles removed therefrom, the separator axes being parallel to and spaced apart from the attachment axis.

2. The attachment of claim 1, wherein the particle separators are spaced equidistantly from the attachment axis.

3. The attachment of claim of claim 1, wherein the particle separators are spaced at equal arcuate intervals about the attachment axis.

4. The attachment of claim of claim 3, wherein there are four of the particle separators and the four particle separators are spaced at 90-degree intervals about the attachment axis.

5. The attachment of claim of claim 1, wherein the housing of each particle separator defines an annular inlet that faces axially forwardly relative to the attachment axis and is concentric about the separator axis.

6. The attachment of claim 5, wherein the inlets of the particle separators are aligned on a plane transverse to the attachment axis.

7. The attachment of claim 5, wherein at least one of the inlets is positioned on a first plane transverse to the attachment axis, at least another one of the inlets is positioned on a second plane transverse to the attachment axis, and the first and second planes are spaced from one another along the attachment axis.

8. The attachment of claim 1, wherein the housing of each particle separator comprises an inner body, an outer duct positioned radially outwardly of the inner body relative to the separator axis, and a transition duct adapted to be coupled to the engine housing and having an annular partition portion that is concentrically positioned between the inner body and the outer duct to separate the first flow passage from the second flow passage.

9. The attachment of claim 8, wherein the inner body and the outer duct cooperate to define an inlet portion of the first flow passage that is upstream of the opening, the inner body and the partition portion cooperate to define an intermediate portion of the first flow passage that is downstream of the opening, the inlet and intermediate portions of the first flow passage cooperate to define the annular portion of the first flow passage, and the transition duct includes a diffuser portion that is coupled to the partition portion and defines a non-annular, outlet portion of the first flow passage.

10. The attachment of claim 9, wherein the diffuser portion of each particle separator extends radially inwardly and axially rearwardly of the partition portion relative to the attachment axis and is adapted to be coupled to the engine housing.

11. The attachment of claim 8, wherein the inner body of each particle separator comprises an axially forward circular edge, an axially rearward point through which the separator axis extends, and a wall extending from the circular edge to the point.

12. The attachment of claim 8, wherein the inner body of each particle separator comprises a peak extending radially outwardly relative to the separator axis upstream of the opening.

13. The attachment of claim 8, wherein the housing of each particle separator comprises a strut positioned in the first flow passage and coupled to the inner body and the outer duct for support of the inner body.

14. The attachment of claim 8, wherein the housing of each particle separator comprises a strut positioned in the first flow passage and coupled to the inner body and the partition portion of the transition duct for support of the inner body.

15. The gas turbine engine of claim 8, wherein the outer ducts of the particle separators cooperate to define a space and the attachment axis extends through the space.

16. An attachment for the air intake of a gas turbine engine comprising an engine housing defining an engine flow passage and a drive shaft defining a drive shaft axis of rotation, the attachment comprising:
    a plurality of particle separators adapted to be coupled to the engine housing and cooperating to define an attachment axis generally coinciding with the drive shaft axis,
    the particle separators being spaced circumferentially about the attachment axis, each particle separator comprising a housing defining a separator axis, a first flow passage having at least a portion that is annular, an annular opening, and an annular second flow passage positioned in fluid communication with the annular portion of the first flow passage through the opening, the annular portion of the first flow passage, the opening, and the second flow passage being concentric about the separator axis, the first flow passage and the second flow passage being configured so that inertia of particles entrained in a stream of air flowing through the annular portion of the first flow passage tends to cause the particles to flow from the annular portion of the first flow passage through the opening into the second flow passage to allow the stream of air to enter the engine flow passage from the first flow passage free of the particles removed therefrom, and a first particle discharger comprising a manifold defining a third flow passage positioned to receive particles from the second flow passages of at least two of the particle separators and a blower coupled to the manifold to discharge particles rom the third flow passage.

17. The attachment of claim 16, wherein the manifold comprises a plurality of scrolls and a connector coupled to each of the scrolls and the blower, each scroll is coupled to the housing of one of the particle separators for fluid communication with the respective second flow passage, and the scrolls and the connector cooperate to define the third flow passage.

18. The attachment of claim 17, wherein the connector is positioned radially outwardly of the separator axes.

19. The attachment of claim 17, wherein the connector includes a portion positioned radially inwardly from the separators and radially outwardly from the attachment axis.

20. The attachment of claim 17, wherein each of the scrolls enlarges in cross-section as it extends clockwise about the separator axis of the particle separator to which it is coupled.

21. The attachment of claim 17, wherein at least one of the scrolls enlarges in cross-section as it extends clockwise about the separator axis of the particle separator to which it is coupled and at least one of the scrolls enlarges in cross-section as it extends counter-clockwise about the separator axis of the particle separator to which it is coupled.

22. The attachment of claim 16, further comprising a second particle discharger comprising a manifold defining a fourth flow passage positioned to receive particles from the second flow passages of at least two other of the particle separators and a blower coupled to the manifold of the second particle discharger to discharge particles from the fourth flow passage.

23. The attachment of claim 22, wherein the manifold of the first particle discharger comprises a plurality of first scrolls and a first connector coupled to the first scrolls and the blower of the first particle discharger, the first scrolls and the first connector cooperate to define the third flow passage, the manifold of the second particle discharger comprises a plurality of second scrolls and a second connector coupled to the second scrolls and the blower of the second particle discharger, the second scrolls and the second connector cooperate to define the fourth flow passage, and each of the first and second scrolls is coupled to the housing of one of the particle separators.

24. The attachment of claim 23, wherein at least one of the first scrolls enlarges in cross-section as it extends clockwise about the separator axis of the particle separator to which it is coupled, at least one of the first scrolls enlarges in cross-section as it extends counter-clockwise about the separator axis of the particle separator to which it is coupled, at least one of the second scrolls enlarges in cross-section as it extends clockwise about the separator axis of the particle separator to which it is coupled, and at least one of the second scrolls enlarges in cross-section as it extends counter-clockwise about the separator axis of the particle separator to which it is coupled.

25. The attachment of claim 16, wherein the particle separators are positioned in the third flow passage so that the second flow passages communicate directly with the third flow passage.

26. An attachment for the air intake of a gas turbine engine comprising an engine housing defining an engine flow passage and a drive shaft defining an axis of rotation, the attachment comprising:

a plurality of particle separators adapted to be coupled to the engine housing and cooperating to define an attachment axis, the particle separators being spaced circumferentially about the attachment axis, each particle separator comprising a housing defining a separator axis, a first flow passage having at least a portion that is annular, an annular opening, and an annular second flow passage positioned in fluid communication with the annular portion of the first flow passage through the opening, the annular portion of the first flow passage, the opening, and the second flow passage being concentric about the separator axis, the first flow passage and the second flow passage being configured so that inertia of particles entrained in a stream of air flowing through the annular portion of the first flow passage tends to cause the particles to flow from the annular portion of the first flow passage through the opening into the second flow passage to allow the stream of air to enter the engine flow passage from the first flow passage free of the particles removed therefrom, and a plurality of particle dischargers, each particle discharger being associated with only one of the particle separators.

27. The attachment of claim 26, wherein each particle discharger comprises a scroll coupled to the housing of the associated particle separator to receive particles from the associated second flow passage into a third flow passage defined by the scroll and a blower coupled to the scroll to discharge the particles from the third flow passage.

28. The attachment of claim 27, wherein each of the scrolls enlarges in cross-section as it extends clockwise about the separator axis of the particle separator to which it is coupled.

29. An engine comprising a shaft defining an axis of rotation and a plurality of particle separators circumferentially spaced about the axis of rotation, each separator comprising a housing comprising an outer sleeve and an inner body which are concentrically disposed relative to a separator axis to provide an annular cross-section core flow passage therebetween with an annular inlet, an intermediate annular passage portion, and an annular core flow outlet, the outer sleeve and the inner body providing the intermediate annular passage portion diverging radially outwardly from the separator axis at a diverging portion between the inlet and the outlet, the housing also comprising a partition disposed between the outer sleeve and the inner body, the outer sleeve and the partition providing an annular opening about the separator axis adjacent to the diverging portion and an annular scavenge flow passage leading away from the opening and extending toward an annular scavenge flow outlet, the diverging portion being configured so that inertia of particles entrained in a stream of air flowing from the annular inlet through the core flow passage to the core flow outlet tends to cause the particles to flow from the core flow passage through the annular opening into the scavenge flow passage for discharge through the scavenge flow outlet to allow the stream of air to pass through the core flow outlet free of the particles removed therefrom, the particle separators cooperating to define a space, the shaft extending into the space so that the axis of rotation is parallel to the separator axes.

30. The engine of claim 29, wherein, with respect to each particle separator, the core flow outlet is disposed axially rearwardly of the annular inlet relative to the separator axis.

31. The engine of claim 30, wherein, with respect to each particle separator, the annular opening is disposed axially rearwardly of the annular inlet and axially forwardly of the core flow outlet relative to the separator axis.

32. The engine of claim 29, wherein the annular inlets of the particle separators face axially forwardly to receive the stream of air flowing axially rearwardly.

33. The engine of claim 29, wherein the particle separators are spaced equidistantly from the shaft.

34. The engine of claim 29, wherein the particle separators are spaced at equal arcuate intervals about the shaft.

\* \* \* \* \*